United States Patent Office 3,297,621
Patented Jan. 10, 1967

3,297,621
TWO STEP POLYMERIZATION OF TETRAPOLYMER
David D. Taft, Minneapolis, Minn., assignor to Archer-Daniels-Midland Company, Minneapolis, Minn., a corporation of Delaware
No Drawing. Filed Jan. 4, 1965, Ser. No. 423,376
25 Claims. (Cl. 260—29.6)

This invention relates to a process of forming emulsions which can, in turn, form clear, high gloss, mar resistant, flexible, solvent resistant polymer films. In a second aspect, this invention relates to the cured films produced thereby. In another aspect, this invention relates to a novel process of interpolymerizing four classes of monomers: (1) ester of $\alpha,\beta$-unsaturated carboxylic acid; (2) ester of $\alpha,\beta$-unsaturated carboxylic acid in which the ester portion contains an oxirane ring; (3) monoethenically unsaturated compound containing a vinyl group; and (4) $\alpha,\beta$-unsaturated mono- or di-carboxylic acid or salt thereof.

The concept of combining copolymerizing monomers to prepare latices is already well known. However, when monomeric substances representing the four classes described above are simultaneously charged to a reactor (using the proportions hereinafter set forth) and conventional polymerization techniques are employed, a high viscosity emulsion (i.e., a latex) is produced which is ineffective in producing films at room temperature.

It has now been discovered that by dividing the monomers into two separately added charges and by controlling the makeup of each charge, an emulsion can be produced which can then be cast, at room temperature, to form a wet film which readily cures by air drying to form a clear, high gloss, mar resistant, flexible, solvent resistant film. The emulsions of the present invention are useful in forming films (protective or decorative films) on a variety of substrates, e.g., wood, metal, paper, paper board, etc.

According to the present process, a first monomer charge is prepared which includes the entire quantity of the ester of the $\alpha,\beta$-unsaturated carboxylic acid, a portion of the ester of the $\alpha,\beta$-unsaturated carboxylic acid in which the ester contains an oxirane ring, a portion of the $\alpha,\beta$-unsaturated mono- or di-carboxylic acid or salt, and approximately 10–70% by weight, e.g. 10–60% by weight of the monoethenically unsaturated compound which by itself forms a hard polymer. The remaining monomers are added as a second charge. In this respect, it is important that each of the four classes of copolymerizable monomers be represented by at least one monomer. Thus, ester of $\alpha,\beta$-unsaturated carboxylic acid in which the ester portion contains an oxirane ring might be represented by glycidyl acrylate, only, while monoethenically unsaturated compound might be represented by a mixture of styrene and methyl methacrylate. Regarding the unsaturated carboxylic acid containing the oxirane ring and the unsaturated carboxylic acid or salt, it has been found that best results are obtained when a major portion of one is employed in the first charge and a minor portion of the other in the same charge, and vice versa in connection with the second charge. In any event, the predominant ingredient in the second charge will be the monoethenically unsaturated compound.

By employing the present split-addition technique, the formation of blocks of the ester of the $\alpha,\beta$-unsaturated carboxylic acid is favored during the first monomer addition and the formation of blocks of the vinyl containing compound is favored during the second addition. Therefore, a large degree of block polymerization occurs. A film cast from an emulsion prepared by this split-addition technique will cure at room temperature to form a durable, glossy film. The cured films exhibit a high degree of adhesion, are tack free, and flexible.

The purpose of the ester of the $\alpha,\beta$-unsaturated carboxylic acid containing an oxirane functionality in the ester portion is twofold; first, to increase adhesion to the substrate; and second, to increase the hardness, strength, and solvent resistance of films cast from the emulsion. A film cast from a latex prepared without this difunctional ester lacks the adhesive strength, hardness, tack-free surface, solvent resistance, and toughness of a film prepared from an emulsion containing this $\alpha,\beta$-unsaturated ester with an oxirane functionality in the ester portion. The $\alpha,\beta$-unsaturated mono- or di-carboxylic acid is also utilized in a dual role. As an organic polymerizable acid it provides stability to the polymeric latex. More importantly, some of the acid functionality reacts with the oxirane ring-containing ester of the $\alpha,\beta$-unsaturated carboxylic acid. Since both the acid and ester are incorporated in the polymeric chains, this reaction provides partial cross-linking in the system, and, thus, yields an emulsion which gives more durable films. This cross-linking reaction, which grafts the polymeric blocks together, is further encouraged by post-heating the emulsion. The emulsion can be neutralized immediately after reaction and then a film can be cast from the emulsion. However, if the emulsion is first heated, generally for ½ to 4 hours, e.g. for 2–3 hours, and then neutralized, preferably with less than the quantitative amount of ammonia, a cured film cast from the resultant has a greater surface hardness (e.g. by a factor of 3×), greater adhesion, better mar resistance, and improved solvent and water resistance.

It can be seen that the block polymerization technique of the present invention permits the formation of emulsions yielding room temperature air-cured films. Emulsions prepared from the same monomer percentages without the unique split-addition technique do not form uniform films at room temperature. Therefore, with the split-addition technique of the present invention, larger percentages of the harder, non-film forming vinyl compound can be incorporated into these latices than in normal air-curing systems containing this component. This monomer imparts to the polymer the desired hardness, mar resistance, water and caustic resistance. The ester of the $\alpha,\beta$-unsaturated carboxylic ester provides the network for the film formation as well as flexibility to the produced films. The other two components partially cross-link during the post-heating treatment to produce stronger films at room temperature.

In accordance with the principles of the present invention, liquid phase, catalyzed emulsion polymerization techniques are employed wherein at least four classes of monomeric substances are employed. The applicable range of quantities of the monomeric substances employed are as follows:

(1) 20–90% by weight of ester of $\alpha,\beta$-unsaturated carboxylic acid;
(2) 20–1% by weight of ester of $\alpha,\beta$-unsaturated carboxylic acid in which the ester portion contains an oxirane ring;
(3) 50–8% by weight of monoethenically unsaturated compound containing a vinyl group; and
(4) 10–1% by weight of an unsaturated mono- or dicarboxylic acid or salt thereof.

The preferred range of quantities of the monomeric substances employed are as follows:

(1) 35–75% by weight of ester of $\alpha,\beta$-unsaturated carboxylic acid;
(2) 10–2% by weight of ester of $\alpha,\beta$-unsaturated carboxylic acid in which the ester portion contains an oxirane ring;

(3) 45–10% by weight of monoethenically unsaturated compound containing a vinyl group; and (4) 8–3% by weight of unsaturated mono- or di-carboxylic acid or salt thereof.

The ingredients are divided into a first charge and a second charge as described in the above. The first charge (which may be termed premix "A") is slowly added at, for example, 160° F., to a previously prepared aqueous emulsifying solution containing anionic and/or non-ionic surfactants and a suitable catalyst. Although the addition temperature (for premix "A") can range from room temperature to the boiling point of water, experience has shown that temperatures of from 150° to 190° F., more usually from 160° to 180° F., are especially desirable. The pressure employed throughout the entire process is preferably atmospheric or substantially atmospheric. However, reduced and elevated pressures can also be used, e.g. elevated pressures are desirable where a volatile monomer has been used. During the addition of premix "A," a rise in temperature is effected to between about 150° to 212° F., more usually from 180° to 205° F., e.g. 195°–200° F. Then, the second charge (premix "B") is added over a period of time, as exemplified in the examples set forth below, and the temperature is permitted to rise, frequently to between about 200°–210° F. At the end of the addition of premix "B," the reactants are then preferably given a heat treatment, generally about ½ to 4 hours, e.g. 2 to 3 hours, at a temperature of between about 140° to 212° F., usually from 160° to 210° F., e.g. from 180°–200° F. in order to post-react the emulsion. The emulsion is then cooled and the pH is adjusted to about 8 by suitable means such as ammonia solution. Thereafter, a film is cast and cured.

In addition to the use of a suitable catalyst in the preparation of a polymeric latex emulsion, as stated in the preceding paragraph, a normal redox polymerization is also applicable for the emulsion preparation. In this case the first charge and most of the water and emulsifying agents are combined with a suitable catalyst in the presence of a reducing agent. A rapid exothermic reaction ensues after which the second charge, remainder of the emulsifiers and water, and a suitable catalyst are emulsified together and added dropwise to the reaction system at the elevated temperature (160°–205°). Besides these two general procedures, other methods of latex emulsion preparation conventional to the field of emulsion polymerization may be applied.

Applicable esters of an α,β-unsaturated carboxylic acid are the various acrylates and methacrylates such as, for example, ethyl acrylate, iso-butyl acrylate, n-butyl acrylate, 2-ethylhexyl acrylate, methyl acrylate, n-propyl acrylate, isopropyl acrylate, isobutyl acrylate, amyl acrylate, isoamyl acrylate, hexyl acrylate, octyl acrylate, 3,5,5-trimethyl hexyl acrylate, decyl acrylate, dodecyl acrylate, cetyl acrylate, octodecyl acrylate, octadecenyl acrylate, n-amyl methacrylate, sec.-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate, butoxyethyl methacrylate, other alkoxyethyl acrylates or methacrylates, and the like. Mixtures of two or more of these esters can be used, e.g. a mixture of ethyl acrylate and isobutylacrylate.

Applicable esters of an α,β-unsaturated carboxylic acid in which the ester portion contains an oxirane ring are glycidyl acrylate and glycidyl methacrylate as well as mixtures thereof.

Applicable monoethenically unsaturated compounds are vinyl aromatic compounds such as styrene, α-methyl styrene, vinyl toluene, the mono-chloro styrenes, vinyl acetate, vinyl chloride and vinylidene chloride; and alkyl methacrylates having an alkyl group containing 1–5 carbon atoms. Mixtures of these compounds can be used, e.g. a mixture of styrene and methyl methacrylate.

Applicable α,β-unsaturated mono- and di-carboxylic acids are methacrylic acid, acrylic acid, crotonic acid, fumaric acid, maleic acid, citraconic acid, and itaconic acid. Mono-alkyl esters of these dicarboxylic acids can also be used. In place of the free acids and half-esters, there may be used water soluble salts thereof, including the ammonium salts and the alkali metal salts such as lithium or potassium carboxylates. Mixtures of these compounds can also be used, e.g. a mixture of acrylic acid and methacrylic acid.

Either anionic or non-ionic emulsifiers, or a blend of anionic and non-ionic emulsifiers, can be used in the emulsion preparation. A specific representative non-ionic surfactant useful in emulsion polymerization of the present invention is nonylphenyl polyethylene glycol ether containing 10–12 ethylene oxy units. However, others may be selected from ethylene oxide condensates of long chain fatty acids and alkyl phenols or alcohols. Regarding the anionics, a large group is available from which one or more may be selected: sodium lauryl sulfate, salts of high molecular weight fatty acids and amino soaps, alkali metal salts of long or branched chain alkyl sulfates and sulfonates, sodium salts of mono- or di-sulfonated hydrocarbons and alkaryl sulfonates.

The polymerization catalyst will usually and preferably be one of the following: potassium persulfate, ammonium persulfate, azo-bis-isobutyronitrile, and cumene peroxide. Other suitable organic catalysts can be employed, alone or in combination with a typical reducing agent.

In order to further demonstrate the invention, the following examples are presented and are given in illustration; and are not intended as limitations on the scope of this invention. Where parts are mentioned, they are parts by weight.

*Example 1*

Premix A:                                           Parts
  Ethyl acrylate _____ 120
  Glycidyl acrylate _____ 11
  Styrene _____ 25
  Methacrylic acid _____ 6
Premix B:
  Glycidyl acrylate _____ 3
  Styrene _____ 35
  Methacrylic acid _____ 4
  Sodium lauryl sulfate _____ 1.0
  Nonylphenyl polyethylene glycol ether (10 moles of ethylene oxide) _____ 5.0
  Potassium persulfate _____ 0.5
  Water _____ 270

The sodium lauryl sulfate, nonylphenyl polyethylene glycol ether, and water were charged into a glass-lined reactor fitted with an agitator, reflux condenser and inlet means for nitrogen. The reactor was swept with nitrogen and the contents were heated to 165° F. The catalyst, potassium persulfate, was then added. After approximately five minutes, premix "A" was slowly added to the reactor while maintaining rapid agitation. The addition was maintained at a rate so that excessive refluxing did not occur. During the addition the temperature was permitted to rise to 195°–200° F.

After the addition of premix "A" was completed, premix "B" was added and the temperature was permitted to rise to 205° F.

The resulting emulsion was then heated for two hours in the range of 185°–195° F.

The emulsion was cooled and the pH was adjusted to 8.0 with a 28% ammonia solution.

Then a .0015″ film of the emulsion was cast on a glass plate in a conventional and known manner. The film cured at room temperature to a clear, tack free, very glossy, durable film in 15 minutes. After one hour the film exhibited tough adhesion, good flexibility, good mar resistance, excellent water and caustic resistance. A Sward hardness of 20 was obtained.

Example II

Premix A: Parts
- Iso-butylacrylate _____ 100
- Glycidyl acrylate _____ 10
- Styrene _____ 35
- Methacrylic acid _____ 6

Premix B:
- Glycidyl acrylate _____ 3
- Styrene _____ 45
- Methacrylic acid _____ 3
- Sodium lauryl sulfate _____ 1.0
- Nonylphenyl polyethylene glycol ether (10 moles of ethylene oxide) _____ 7.0
- Water _____ 246

The reactor was prepared as in Example I and the procedure of adding the premix "A" and premix "B" to the reactor was followed. However, the catalyst solution was slowly added while premix "A" and premix "B" were added. The times of addition for both monomer charges were the same as in Example I. The temperature in this example was permitted to rise to 205° F. Post-heating was conducted for two hours at between 180°–200° F.

After the emulsion was cooled and adjusted to a pH of 8.1 with 28% ammonia solution, a .0015″ film was cast in a conventional manner. After 15 minutes at room temperature, a clear, tack free, glossy, water and caustic resistant film was obtained. A Sward hardness of 22 was obtained.

Example III

Premix A: Parts
- 2-ethylhexy acrylate _____ 90
- Glycidyl acrylate _____ 9
- Styrene _____ 35
- Methacrylic acid _____ 6

Premix B:
- Glycidyl acrylate _____ 3
- Styrene _____ 55
- Methacrylic acid _____ 2
- Potassium persulfate (4% sol.) _____ 20
- Sodium lauryl sulfate _____ 2.1
- Nonylphenyl polyethylene glycol ether (10 moles of ethylene oxide) _____ 7
- Water _____ 226

The reactor was prepared as in Example I and the procedure of adding the premix "A" and premix "B" to the reactor was followed. During the course of the final addition, the temperature rose to 210° F. In this example, one-fourth of the catalyst solution was added initially, and the remainder was slowly added during the course of the monomer additions.

An excellent film was produced from the polymeric solution.

Example IV (split addition)

Premix A: Parts
- Ethyl acrylate _____ 110
- Glycidyl acrylate _____ 4.5
- Styrene _____ 50
- Methacrylic acid _____ 1.5

Premix B:
- Glycidyl acrylate _____ 7.5
- Styrene _____ 32
- Methacrylic acid _____ 7.5
- Sodium lauryl sulfate _____ 2.1
- Nonylphenyl polyethylene glycol ether (10 moles of ethylene oxide) _____ 10
- Potassium persulfate _____ 0.6

The reactor was prepared as in Example I and the procedure of adding the premix "A" and premix "B" was followed. The emulsion was subjected to post-heat treatment as in Example I. Then, the pH of the emulsion was adjusted to 7.3. A .0015″ film was then cast. After seven minutes, the film had cured to a highly glossy, hard, durable, clear film.

Example V (Example IV without split addition)

Premix A and premix B, combined: Parts
- Ethyl acrylate _____ 110
- Styrene _____ 82
- Glycidyl acrylate _____ 12
- Methacrylic acid _____ 9
- Sodium lauryl sulfate _____ 2.1
- Nonylphenyl polyethylene glycol ether (10 moles of ethylene oxide) _____ 10
- Potassium persulfate _____ 1

The water, sodium lauryl sulfate, and nonylphenyl polyethylene glycol ether were charged into a reactor as in Example I. Five minutes after the addition of the catalyst, addition of the total monomer charge was started. This addition continued for about two hours. The temperature was held to less than 201° F. The polymeric emulsion was then heated for two hours, cooled, and adjusted to a pH of about 8.1 with ammonia. A .0015″ and .003″ film of the emulsion dried to a fine powder as film formation did not occur at room temperature.

It will be noted that the ingredients of Examples IV and V are virtually identical. However, in Example IV, split-addition was employed and in Example V a single addition was used. The resultant in Example IV was a good film while the resultant in Example V was merely a useless powder.

The following example illustrates the use of a redox polymerization technique in the preparation of the inventive split-addition emulsion system.

Example VI (Sodium salt of an alkylaryl polyether sulfonate (Triton X–200)) _____ 3

Redox charge:
- Water _____ 200
- Ammonium persulfate _____ 1
- Sodium metabisulfate _____ 1

Premix A: Parts
- Ethyl acrylate _____ 114
- Styrene _____ 25
- Glycidyl acrylate _____ 6
- Methacrylic acid _____ 3
- Triton X–201 _____ 1
- Water _____ 43
- Potassium persulfate _____ .5

Premix B:
- Styrene _____ 44
- Glycidyl acrylate _____ 3
- Methacrylic acid _____ 2

The redox charge and premix "A" are mixed under rapid agitation and nitrogen sparging. An exothermic reaction from room temperature to 192° occurs in five minutes.

After the initial exothermic reaction, the emulsion is heated for 15 minutes and an emulsion of premix "B" and the remaining emulsifier, catalyst, and water are slowly added. The reaction mixture is heated for two hours at 185° F., cooled to room temperature and neutralized with 28% ammonia. A film cast from this emulsion latex is similar in properties to the film described in Example I.

Example VII (Sodium salt of an alkylaryl polyether sulfonate (Triton X–200)) _____ 4
Water _____ 200
Potassium persulfate _____ 1.5

Premix A: Parts
- Ethyl acrylate _____ 110
- Methyl methacrylate _____ 25
- Glycidyl acrylate _____ 6
- Acrylic acid _____ 3

Premix B:
- Methyl methacrylate _____ 45
- Glycidyl acrylate _____ 3
- Acrylic acid _____ 1

The reactor was prepared as in Example I and the procedure of adding the premix "A" and premix "B" was followed. The emulsion was subjected to a post heat treatment as in Example I, cooled, and the pH adjusted to 8.0. A .0015" cast film cured to a glossy hard, clear film.

*Example VIII*

This example illustrates the use of more than one monomer represent a class of copolymerizable monomers.

The procedure of Example VII is followed with the following exceptions. First, a mixture of equal parts by weight of ethyl acrylate and isobutyl acrylate is substituted for the ethyl acrylate. Second, a mixture of methyl methacrylate and styrene (30 weight percent styrene) is substituted for the methyl methacrylate. Third, a mixture of equal parts by weight of acrylic acid and mono-methyl itaconate is substituted for the acrylic acid. In making these substitutions, the weight of the mixed monomers used is the same as the weight of the single monomer being replaced. A film cast from the resulting emulsion will air dry at room temperature to form a hard film.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A method of producing an interpolymeric latex composition comprising in a first step emulsion polymerizing a mixture of the following components: 120 parts by weight ethyl acrylate, 11 parts by weight glycidyl acrylate, 25 parts by weight styrene and 6 parts by weight methacrylic acid; in a subsequent second step emulsion polymerizing the products of the first step with the following additional components: 3 parts by weight glycidyl acrylate, 35 parts by weight styrene and 4 parts by weight methacrylic acid; and thereafter heat treating the emulsion for about two hours at about 185°–195° F.

2. The method of claim 1 wherein the heat treated emulsion is cast into a film and the film is cured at about 68° F.

3. The composition produced by the method of claim 1.

4. The film produced by the method of claim 2.

5. The process of preparing an interpolymeric latex composition which comprises:
   (I) in a first step, emulsion polymerizing a mixture of the following monomers:
      (A) 20–90% by weight of ester of $\alpha,\beta$-unsaturated carboxylic acid,
      (B) only a portion of a total amount of 20–1% by weight of glycidyl ester of $\alpha,\beta$-unsaturated carboxylic acid,
      (C) only a portion amounting to 10–70% by weight of a total amount of 50–8% by weight of monovinyl compound,
      (D) only a portion of a total amount of 10–1% by weight of compound selected from the group consisting of (1) monoesters of $\alpha,\beta$-unsaturated dicarboxylic acids, (2) $\alpha,\beta$-unsaturated carboxylic acids, and (23) salts thereof; and
   (II) in a subsequent second step, emulsion polymerizing the product of the first step with the following monomers:
      (E) the remainder of (B),
      (F) the remainder of (C), and
      (G) the remainder of (D);
   (III) the weight percentages of the various monomers being based on the total weight of monomers used to form said latex.

6. The process of claim 5 wherein the total amounts of each of the monomers is:
   (a) 35–75% of monomer (A);
   (b) 10–2% of monomer (B);
   (c) 45–10% of monomer (C); and
   (d) 8–3% of monomer (D).

7. The process of claim 5 wherein monomer (A) is selected from the group consisting of ethyl acrylate, isobutyl acrylate, n-butyl acrylate, and 2-ethylhexyl acrylate; wherein monomer (B) is selected from the group consisting of glycidyl acrylate and glycidyl methacrylate; wherein monomer (C) is selected from the group consisting of styrene, vinyl acetate, vinyl chloride, vinylidene chloride, and alkyl methacrylates in which the alkyl portion contains 1–5 carbon atoms; and wherein monomer (D) is selected from the group consisting of methacrylic acid, acrylic acid, and itaconic acid.

8. The process of claim 5 which includes the further step of neutralizing the polymer formed in the second step.

9. The process of claim 5 which includes the further step of casting a film of the polymer formed in the second step and curing said film.

10. The process of claim 5 which includes the further step of heat treating the polymer formed in the second step for ½ to 4 hours at a temperature of 140°–212° F.

11. The method of claim 10 wherein said heat treating is at a temperature of 160°–210° F.

12. The method of claim 10 wherein said heat treating is for 2–3 hours at a temperature of 180°–200° F. and wherein the pH of the heat treated polymer is subsequently adjusted to about 8.

13. The method of claim 10 wherein monomer (A) is selected from the group consisting of ethyl acrylate, isobutyl acrylate, n-butyl acrylate, and 2-ethylhexyl acrylate; wherein monomer (B) is selected from the group consisting of glycidyl acrylate and glycidyl methacrylate; wherein monomer (C) is selected from the group consisting of styrene, vinyl acetate, vinyl chloride, vinylidene chloride, and alkyl methacrylates in which the alkyl portion contains 1–5 carbon atoms; and wherein monomer (D) is selected from the group consisting of methacrylic acid, acrylic acid, and itaconic acid.

14. The method of claim 10 wherein the heat treated emulsion is neutralized with ammonia.

15. The process of claim 5 wherein about one-half of the total amount of monomer (B) and about one-half of the total amount of monomer (D) are used in the first step, the remaining one-half of monomers (B) and (D) being used in the second step.

16. The process of claim 15 wherein monomer (A) is selected from the group consisting of ethyl acrylate, isobutyl acrylate, n-butyl acrylate, and 2-ethylhexyl acrylate; wherein monomer (B) is selected from the group consisting of glycidyl acrylate and glycidyl methacrylate; wherein monomer (C) is selected from the group consisting of styrene, vinyl acetate, vinyl chloride, vinylidene chloride, and alkyl methacrylates in which the alkyl portion contains 1–5 carbon atoms; and wherein monomer (D) is selected from the group consisting of methacrylic acid, acrylic acid and itaconic acid.

17. The process of claim 16 which further includes the steps of neutralizing the polymer formed in the second step, casting a film with said neutralized polymer, and curing said film.

18. Product produced by the process of claim 5.
19. Product produced by the process of claim 8.
20. Product produced by the process of claim 10.
21. Product produced by the process of claim 12.
22. Product produced by the process of claim 15.
23. Product produced by the process of claim 7.
24. The cured film produced by the process of claim 9.
25. The cured film produced by the process of claim 17.

No references cited.

MURRAY TILLMAN, *Primary Examiner.*

J. ZIEGLER, *Assistant Examiner.*